US006353831B1

(12) United States Patent
Gustman

(10) Patent No.: US 6,353,831 B1
(45) Date of Patent: Mar. 5, 2002

(54) DIGITAL LIBRARY SYSTEM

(75) Inventor: Samuel Gustman, Santa Monica, CA (US)

(73) Assignee: Survivors of the Shoah Visual History Foundation, Los Angeles, CA (US)

( * ) Notice: Subject to any disclaimer, the term of this patent is extended or adjusted under 35 U.S.C. 154(b) by 0 days.

(21) Appl. No.: 09/543,519

(22) Filed: Apr. 6, 2000

Related U.S. Application Data

(63) Continuation of application No. 09/184,796, filed on Nov. 2, 1998, now Pat. No. 6,092,080.

(51) Int. Cl.[7] .............................................. G06F 17/30
(52) U.S. Cl. ...................... 707/103 R; 707/10; 707/104
(58) Field of Search ............................ 707/1, 5, 101, 707/102, 204, 205, 10, 103, 104, 3

(56) References Cited

U.S. PATENT DOCUMENTS

| | | | |
|---|---|---|---|
| 3,593,309 A | 7/1971 | Clark, IV et al. ........... 707/531 |
| 3,602,895 A | 8/1971 | Loizides et al. .............. 707/1 |
| 3,603,937 A | 9/1971 | Loizides et al. ............ 707/101 |
| 3,613,086 A | 10/1971 | Loizides et al. ............ 707/101 |
| 3,643,226 A | 2/1972 | Loizides et al. .............. 707/1 |
| 3,646,524 A | 2/1972 | Clark, IV et al. .............. 707/1 |
| 3,651,483 A | 3/1972 | Clark, IV et al. ........... 712/300 |
| 3,670,309 A | 6/1972 | Amdahl et al. ............. 711/129 |
| 3,701,972 A | 10/1972 | Berkeley et al. ............. 710/36 |
| 3,947,825 A | 3/1976 | Cassada ........................ 707/3 |
| 4,310,883 A | 1/1982 | Clifton et al. .............. 707/205 |
| 4,322,813 A | 3/1982 | Howard et al. ............... 700/73 |
| 4,358,824 A | 11/1982 | Glickman et al. ............. 707/5 |
| 4,408,273 A | 10/1983 | Plow .......................... 707/202 |
| 4,819,156 A | 4/1989 | Delorme et al. ............. 714/15 |
| 4,928,233 A | 5/1990 | Millis ........................ 345/419 |
| 4,945,428 A | 7/1990 | Waldo ......................... 360/92 |
| 4,987,533 A | 1/1991 | Clark et al. ................ 707/204 |
| 5,077,658 A | 12/1991 | Bendert et al. ................ 707/1 |
| 5,124,927 A | 6/1992 | Hopewell et al. ........... 700/121 |
| 5,151,989 A | 9/1992 | Johnson et al. ............... 707/10 |
| 5,237,682 A | 8/1993 | Bendert et al. ............. 707/205 |
| 5,287,459 A | 2/1994 | Gniewek ...................... 369/34 |
| 5,297,249 A | 3/1994 | Bernstein et al. ........... 345/356 |
| 5,317,728 A | 5/1994 | Tevis et al. ................. 707/204 |
| 5,317,729 A | 5/1994 | Mukherjee et al. ......... 707/204 |
| 5,394,382 A | 2/1995 | Hu et al. ...................... 369/32 |
| 5,414,644 A | 5/1995 | Seaman et al. ............. 707/183 |
| 5,414,808 A | 5/1995 | Williams .................... 345/328 |

(List continued on next page.)

OTHER PUBLICATIONS

Ramaiah, CK, Multimedia systems in libraries and their applications, , Defence Scientific Information and Documentation, vol. 18, issue 6, pp 25–40/, Nov. 1998.*

The Gale Group, IBM Digital Library Unveils Products, Partners, Plans, Newsbytes, pp. 1–5, Jul. 1997.*

*Primary Examiner*—Diane D. Mizrahi
(74) *Attorney, Agent, or Firm*—The Hecker Law Group

(57) ABSTRACT

The invention is a digital library system that includes: 1) a data capture mechanism that includes data transfer and cataloguing mechanisms, 2) an asset management system for access and storage management of data, and 3) a distribution system for distributing the data and system functionality. A data capture system includes a transfer system and a cataloguing system. The transfer system converts multimedia material that exists in analog form to a digital format. The cataloguing system catalogues data. The cataloguing system creates a catalogue that can be used to perform content-based searches. A content-based search retrieves data based on the ideas or concepts contained in the data. An asset management system is used to access the data using the catalogue created by the cataloguing system. A distribution facility can be used to transmit the data thus giving a user access to all of the data contained in the digital library system despite the user's location.

20 Claims, 9 Drawing Sheets

U.S. PATENT DOCUMENTS

| | | | |
|---|---|---|---|
| 5,421,008 A | 5/1995 | Banning et al. | 707/4 |
| 5,448,726 A | 9/1995 | Cramsie et al. | 707/103 |
| 5,508,732 A | 4/1996 | Bottomley et al. | 725/93 |
| 5,574,905 A | 11/1996 | deCarmo | 707/1 |
| 5,630,121 A | 5/1997 | Braden-Harder et al. | 707/102 |
| 5,638,443 A * | 6/1997 | Stefik | 705/44 |
| 5,664,227 A | 9/1997 | Mauldin et al. | 707/516 |
| 5,689,648 A * | 11/1997 | Diaz | 707/26 |
| 5,832,495 A * | 11/1998 | Gustman | 707/102 |
| 5,892,909 A * | 4/1999 | Grasso | 395/200.31 |
| 5,893,095 A * | 4/1999 | Jain | 707/6 |
| 5,907,837 A * | 5/1999 | Ferrel | 707/3 |

* cited by examiner

DIGITAL LIBRARY SYSTEM

This is a continuation of application Ser. No. 09/184,796 filed Nov. 2, 1998, now U.S. Pat. No. 6,092,080.

BACKGROUND OF THE INVENTION

1. Field of the Invention

This invention relates to a system for cataloguing, storing, retrieving, and distributing multimedia data.

2. Background

Increasingly, computer systems are being used to present multimedia material. Such material is usually in the form of text, graphics, video, animation, and sound. (Other examples include books, manuscripts, pictures, film, audio recordings.) Two or more of these data types are usually combined to form the multimedia data presented by the computer system. A computer system that is used to present multimedia material is called a multimedia system.

The multimedia material must be captured before it can be used by a multimedia system. For example, some or all of the multimedia data is in an analog format and must be converted to digital form before it can be used by a multimedia system. The multimedia data converted from analog must be managed. A management facility is needed to manage and maintain the data. An access capability is needed to search and retrieve stored multimedia data. Once it is retrieved, a distribution facility is needed to distribute the data to a multimedia system. Thus, a system is needed to capture, access, manage, and distribute multimedia material. Such a system is digital library system.

A number of patents that describe software and/or hardware systems are provided below. These systems do not provide a digital library system that can capture, access, manage, and distribute multimedia material.

A search system is described in U.S. Pat. No. 5,241,671, Reed et al., issued on Aug. 31, 1993 relates to a multimedia system that includes a database that is comprised of words, phrases, numbers, letters, maps, charts, pictures, moving images, animations, and audio information. A search capability is provided that provides a series of entry paths for locating information in the database. An entry path allows a user to enter a search request that consists of a set of valid terms or stop terms. A stop term is a term that exists on a stop term list and may be the words "the" or "a", for example. Valid terms are linked to related terms using a stem index. A stem index contains a root term and a set of stems for each term that is related to the root word. For example, the word leaf is linked to terms "leaves" and "leafing".

A repetitive analysis event system that accesses data using a time-based number is described in U.S. Pat. No. 5,414,644, Seaman et al., issued on May 9, 1995. The system uses an information library that consists of visual data storage and a textual database for storing written descriptions of the visual data and a glossary of keywords that identify repetitive events or behavior. A behavioral label is used to define a behavioral activity. A series of images or video clips are associated with the behavioral label. A user can retrieve images by identifying a subject, a behavioral activity, or other type of descriptive text. A chronological timeline is used to control the order in which the images are displayed. That is, the images are displayed in sequential order using the time-based number.

A method for storing and retrieving information that uses a "three file" concept is described in U.S. Pat. No. 3,670,310, Bharwani et al., issued on Jun. 13, 1972. This concept is so named because it uses three files: an index file, a search file, and a data file. The index file contains a keyword record for each keyword. A keyword is a word that exemplifies the meaning or value of information. The search file contains a search record for each data record in the data file. A search record contains an address for its associated data record in the data file, the keywords for the data record. Each keyword in the search record has an associated link address to another search record that contains the same keyword. Bharwani states that it improves on the "three file" concept by: 1) using an adjustable keyword length in the index file to conserve space, 2) providing a means for marking items as deleted so that they can be bypassed, 3) automatically generating keywords based on field values contained in a data record, and 4) providing continuous searching even during a database update procedure.

A knowledge based information retrieval system is described in U.S. Pat. No. 5,404,506, Fujisawa et al., issued on Apr. 4, 1995. The system provides a visual interface for local searching and a natural language interpreter for global search. The natural language interpreter is used to infer the meaning of a noun phrase or a nominal phrase. The inferred meaning is used to retrieve information.

A system for distributed data from a centralized location to a remote location is described in U.S. Pat. No. 4,974,149, Valenti, Nov. 27, 1990. The centralized system generates a descriptor that describes the data and its source location. The descriptor may further define when the data is to be retrieved. The remote systems use the descriptor to retrieve the data. A preferred embodiment uses the descriptor to distribute software (i.e., executable and data files).

A system for database retrieval wherein entries in different databases are retrieved by a process of matching key words of the databases is described in U.S Pat. No. 5,210,868, Shimada et al., issued on May 11, 1993. Examples of two such databases are a mapping database and a customer attribute database. A dictionary is used to separate a keyword from a first database into common and proper noun subparts. Common and proper noun synonyms are inferred according to a set of rules. The synonyms are combined using a combination rule and then compared with keywords in a second database to generate a final matching result.

A system for assembling documents, or files is disclosed in U.S. Pat. No. 5,222,236, Potash et al., issued on Jun. 22, 1993. Documents are stored in a library that is composed of a series of volumes. A volume is a logical grouping of documents such as legal documents. A volume is decomposed into a set of chapters. For example, a chapter within a "legal documents" volume might contain documents related to commercial law. The system further provides a series of user interface screens that prompt a user for input that is used to update a data field in a document (e.g., addressee).

A process for creating a search query from a natural language query is described in U.S. Pat. No. 5,265,065, Turtle, issued on Nov. 23, 1993. A database contains a plurality of stopwords and phrases. The database is used to eliminate stopwords from the natural language query. The remaining words are stemmed to their basic roots, or words. The stemmed words are compared against the database to identify phrases. The phrases and any remaining stemmed roots form the search query and are referred to as query nodes of a query network. The query nodes are also representation nodes of a document. A synonym database is used for finding synonyms.

A service for managing hypertext/hypermedia links is described in U.S. Pat. No. 5,297,249, Bernstein et al., issued on Mar. 22, 1994. A Link Manager Services (LMS) component provides a universal End User Interface (EUI) including menus and dialog boxes that can be called by an application program when a link, or marker, is selected by an application user. The LMS accesses a database that contains information about markers and their associated "presenters" (e.g., application or program). In addition, the LMS includes a viewer capability for viewing and maintaining existing links and creating new links. The LMS is used at runtime to generate menus and dialog boxes and manage the hypertext/hypermedia links.

A system that interconnects audio-video equipment such as video tape record or video production switcher using one or more "AV LANs" in U.S. Pat. No. 5,307,456, Mackay, issued on Apr. 26, 1994. Generic device commands are communicated over an AV LAN to a device translator. The device translator translates the generic command into a device-specific command. The AV LANs are interconnected using bridges. The AV LANs can further be used to interconnect workstations, minicomputers, mainframes and personal computers. The workstations can be used to display information about the resources attached to an AV LAN.

A text searching system that includes: 1) a morphological analyzer that generates a set of words that are lexically related to an input word and that together with the input word constitute a set of search words and 2) a search engine for searching an index to detect the occurrence of any of the search words in the index is described in U.S. Pat. No. 5,369,577, Kadashevich et al., issued on Nov. 29, 1994. The morphological analyzer includes a recognition engine that identifies derivational information for a given input word. A thesaurus database is used to generate a list of synonyms for the lexically related words. The synonyms and variations of the synonyms (i.e., words formed by adding a suffix to a synonym) are included in the set of search words. The system can further be used to expand an input word into related words by removing suffixes. Further expansion is accomplished by using the thesaurus database to obtain synonyms for the related words.

A system for dynamically loading software libraries. A service requester of an application program sends a request to a loader module of an application program is described in US. Pat. No. 5,410,698, Danneels et al., issued on Apr. 25, 1995. The application's loader module forwards the request to a second loader module outside the application program. The service requester can be a media services manager of a multicast application program that issues a request to load a media service provider library. A global dynamic loader receives the request as part of the multicast application program and forwards it to the global dynamic loader executable (i.e., the second loader module) that loads the media service provider library.

A method for manipulating video data that allow for the definition of frames in a string of isochronous data using frame numbers or names is described in U.S. Pat. No. 5,414,808, Williams et al., issued on May 9, 1995. Frames can be grouped into segments. Frames can be referenced and operations performed on frames using the frame definitions.

A method for storing data in data stores at various locations in a network is described in U.S. Pat. No. 5,442,771, Filepp et al., issued on Aug. 15, 1995. These locations can be the user system and network concentrator facilities hierarchically located between the user system and the network host. Data is cached in either a temporary cache (e.g., RAM) or a variable-content permanent stage (e.g., variable-content, fixed disk file). A least-recently-used approach is used to determine the data that is retained in a store. In addition, storage candidacy and version control parameters are used to insure currency if maintained for time-sensitive data (e.g., news or pricing data).

An image data filing system consisting of a library for storing a plurality of image storage media (e.g., optical disks), a disk array for storing image data retrieved from the image storage media, a console for entering user instructions, and an output device for displaying image data is described in U.S. Pat. No. 5,463,771, Sotoyanagi et al., issued on Oct. 31, 1995. A control device is used to control the retrieval and storage operations.

A system for storing and retrieving digital images is described in U.S. Pat. No. 5,493,677, Balogh et al., issued on Feb. 20, 1996. A caption or other metadata can be associated with a digital image. A natural language capability removes ambiguities from the metadata input by a user prior to its storage. The natural language capability determines matches between a user query and the stored metadata. The system allows a user to select an image, review licensing terms for the selected image, and order the image.

A technique for dynamically optimizing the processing of a database query execution plan is described in U.S. Pat. No. 5,495,608, Antoshenkov et al., issued on Feb. 27, 1996. A decision is made during processing to either retrieve records using indexed keys or by retrieving all records based on which approach is optimal.

SUMMARY OF THE INVENTION

The invention is a digital library system that includes: 1) a data capture mechanism that includes data transfer and cataloguing mechanisms, 2) an asset management system for access and storage management of data, and 3) a distribution system for distributing the data and system functionality.

A data capture system includes a transfer system and a cataloguing system. The transfer system converts multimedia material that exists in analog form to a digital format. In addition to the data output from the transfer system, the cataloguing system can also receive textual data as input. The cataloguing system catalogues the multimedia and textual data. The cataloguing system creates a catalogue that can be used to perform content-based searches. A content-based search retrieves data based on the ideas or concepts contained in the data. Data is stored by the transfer system independent of content. The cataloguing systems creates a catalogue that specifies the content of the data. The catalogue includes one or more catalogue elements which can be complex multimedia assets. A complex multimedia asset can consist of one or more attribute elements. An attribute element is an attribute that can have attributes (i.e., pieces of information). A catalogue element is associated with a portion of multimedia data (e.g., one or more frames of video data).

An asset management system is used to access the data using the catalogue created by the cataloguing system. The asset management system identifies data having the desired content. The asset management system includes search tools to query the catalogue to identify a set of catalogue elements having attributes that satisfy a search criteria. The data associated with the catalogue elements have the desired content.

The asset management system includes a browser, an indexing server, an archive server, a tertiary storage manager, and a method player. Generalized interfaces define a communication protocol that can be used by any vendor-supplied browser, indexing server, archive server, tertiary storage manager, and/or method player to communicate with another asset management system component.

A request for data is received by a browser. The browser in combination with the indexing server locates a set of catalogue elements that satisfy criteria specified in the request. The set of catalogue elements are sent to an archive server for retrieval. The archive server maintains an identification of the location of the multimedia data. Thus, when a set of catalogue elements is received from the browser, the archive server can identify the location of the portions of multimedia data having the desired content (i.e., the portions of multimedia data associated with the catalogue elements contained in the set).

The multimedia data associated with a catalogue element is retrieved by the archive server in conjunction with a tertiary storage manager. A tertiary storage manager manages a store that contains multimedia data. The system can consist of multiple instances of tertiary storage manager to manage each data store. The tertiary storage manager can manage various types of data store. The archive server identifies the tertiary storage manager that manages the store containing the requested multimedia data. The tertiary storage manager retrieves the data and transmits the data to a method player. The method player prepares the data (converts the data from MPEG to video format) and transmits the prepared data to the browser. The browser formats a display region and displays the data in the display region.

A caching mechanism is implemented by the asset management facility to store retrieved data locally. Preferably, cache is used to store multimedia data that is being or will be played on the browser. The asset management facility locates the data and, if necessary, stores the data in local cache. Preferably, cache management is supplied by an instance of tertiary storage manager. The tertiary storage manager that manages the data denormalizes the data allowing for faster access.

A tertiary storage manager that manages the cache uses a least recently used (LRU) scheme. Thus, multimedia data that has the oldest access time is purged to make room for newly accessed data. The archive server determines whether the local cache contains the multimedia data associated with the catalogue elements. If the multimedia data is not stored in local cache, the archive server can query other archive servers to determine whether the data is stored in a remote cache. If the archive server cannot find a cached copy of the data, it will attempt to retrieve the data from permanent storage (e.g., a tape system).

A distribution facility can be used to transmit the data thus giving a user access to all of the data contained in the digital library system despite the user's location. Multimedia data is permanently stored at a centralized location. Multimedia data that is requested by a user is cached from the centralized location to the user site. A wide area network can be used to interconnect user sites with the main site. The WAN can be used to transmit data that resides at the main site or another user site to a requesting user site. In addition, data can be transferred between sites via the Internet.

Either a centralized or decentralized distribution architecture can be used with the invention to distribute functionality (e.g., asset management functionality). In a centralized architecture, the asset management facility is located at a centralized site. Users connect to the asset management facility via the Internet, for example. The catalogue and multimedia data are stored at the central site. The catalogue is accessed at the central, or main site to identify the requested data. The data is then transmitted to the user via the Internet.

In a decentralized architecture, an instance of the asset management system is located at the user's site. A copy of the catalogue is resident at the user site. The multimedia data is permanently stored at a main site with copies of data that has accessed stored at the user's site. The local catalogue is accessed to identify the data requested in a user request. If a copy of the requested data does not exist at the local site, a search is made for the data at another site. The search first examines the cache at the other sites. If the data cannot be found in cache at the local or another site. The local site accesses the main site to retrieve the requested data. A vehicle such as a WAN or the Internet can be used to transmit the data between sites.

The asset management system can include various access levels (i.e., simple to complex) each of which is associated with a level of interface to access the data based on the type of audience. The audience can be an individual or a group of people, for example. At the complex access level, the audience must be able to understand the catalogue structure (i.e., catalogue element and associated attributes and attribute elements).

At a programmer's level, an interface consisting of low-level software routines are available to query the catalogue and its associated attributes and attribute elements. The low-level software routines can be used to create a higher level of abstraction of objects. These objects can become selectable elements in a graphical user interface (GUI) for a development tool that can be used to create a higher-level interface. The GUI can include a drag and drop capability to create a GUI and associate GUI objects to objects that supply functionality (e.g., objects contained in a higher-level interface.)

A development tool can be used to create a browser, for example. A browser can include the ability to view instances contained in a catalogue and its associated attributes and attribute elements. The user can create a query by dragging these instances into a search box and specifying conjunction information (e.g., "and" or "or).

At the simplest access level, predefined sets are created and stored for viewing by individuals using a single video viewing station or in a virtual reality environment or video display kiosks for viewing by groups of people.

DETAILED DESCRIPTION OF THE INVENTION

A digital library system is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
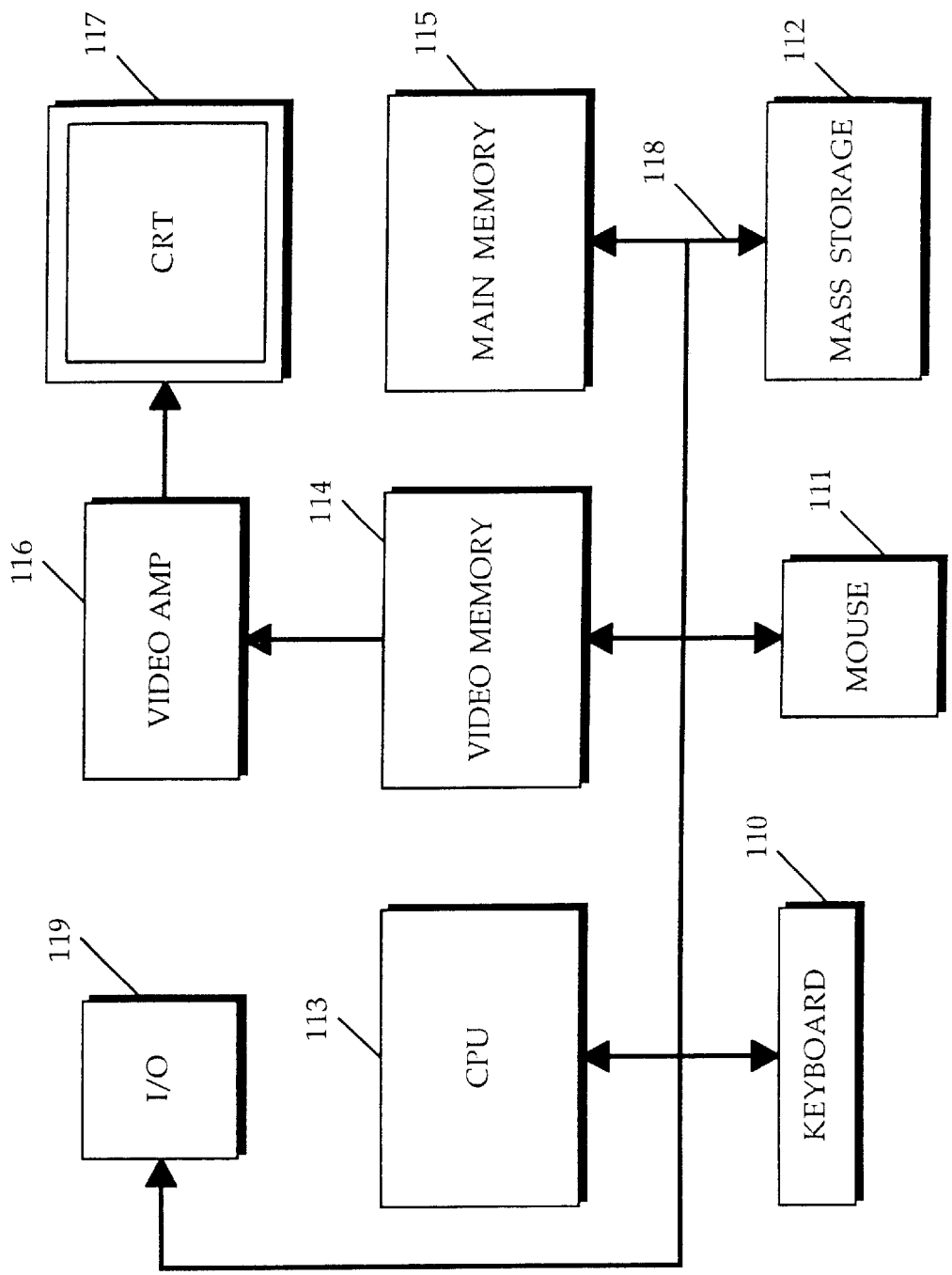
FIG. 1 provides an example of a general purpose computer to be used with the present invention.

An embodiment of the invention can be implemented as computer software in the form of computer readable program code executed on a general purpose computer such as illustrated in FIG. 1. A keyboard 110 and mouse 111 are coupled to a bidirectional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, network communications card, modem, A/V (audio/video) I/O, etc.

The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

The computer system described above is for purposes of example only. An embodiment of the invention may be implemented in any type of computer system or programming or processing environment.

The invention is a digital library system that includes: 1) a data capture mechanism that includes data transfer and cataloguing mechanisms, 2) an asset management system for access and storage management of data, and 3) a distribution system for distributing the data and system functionality.

Figure 2:
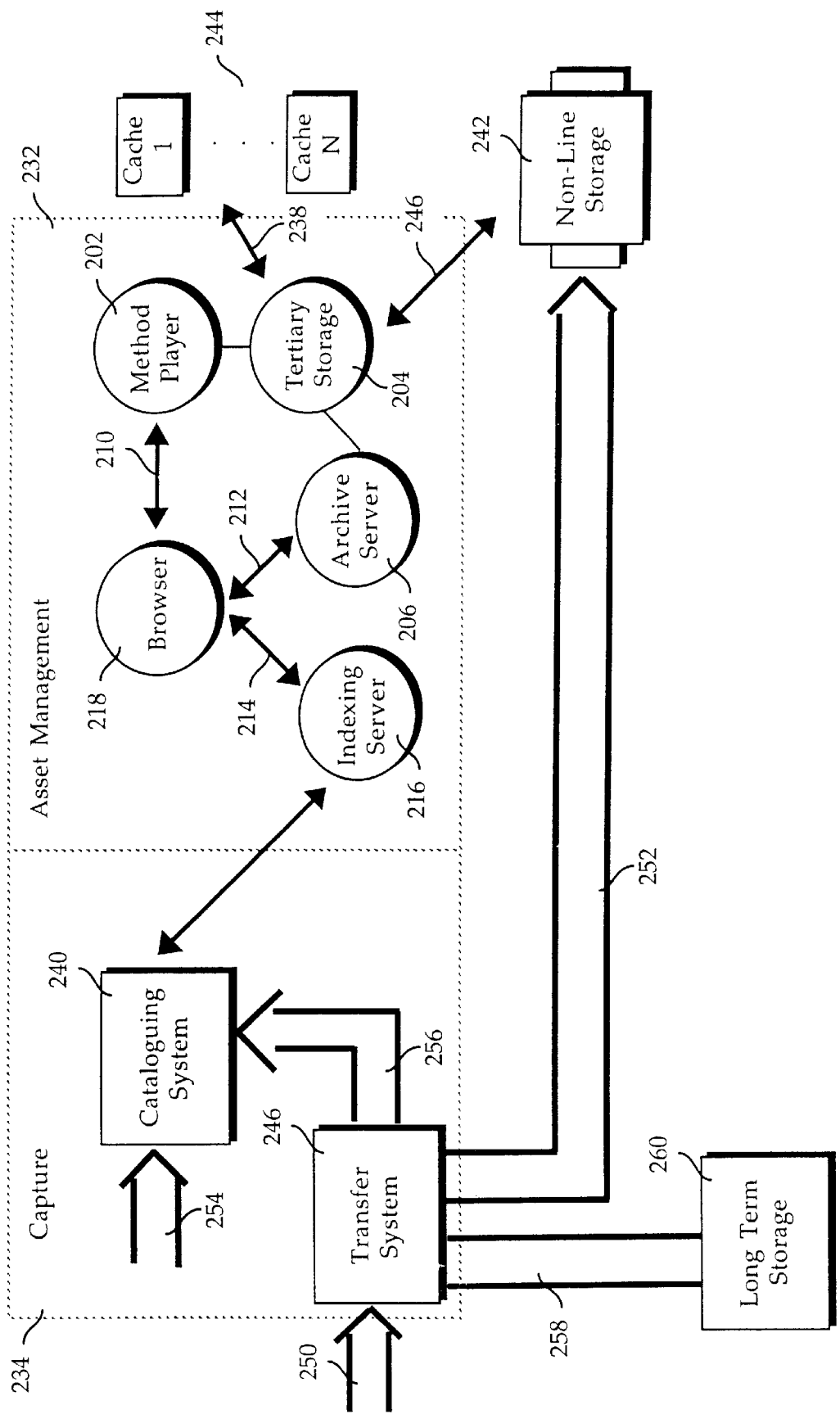
FIG. 2 provides a block overview of the data capture and interface subsystems according to an embodiment of the present invention.

The data capture system captures multimedia data in whatever format (e.g., analog or digital) and stores it in permanent storage independent of its content. An asset management system uses a content specification to identify data captured by the transfer system to satisfy a data request. FIG. 2 provides a block overview of the data capture and asset management systems according to an embodiment of the present invention.

Data Capture

The data capture system includes a transfer system and a cataloguing system. The transfer system converts multimedia data from analog to digital format. The cataloguing system catalogues the multimedia data output from the transfer system as well as textual input.

Transfer System

Referring to FIG. 2, multimedia data 250 is input to transfer system 246 in data capture subsystem 234. Multimedia data 250 is video and/or audio data, for example. Transfer system 246 consists of one or more transfer stations. A system comprised of multiple transfer stations with an interface is available from Electrosonics, Los Angeles, California. Each transfer station is capable of taking analog input such as a videotape and converting it into multiple types of output.

The conversion capabilities of transfer system 246 can be used to convert analog data for use with the invention. For example, multimedia data 250 is converted by transfer system 246 to Digital Betacam version 258. Digital Betacam version 258 is sent to long term storage 260 for preservation. A timecoded VHS version 256 is also created from multimedia data 250 and sent to cataloguing system 240. MPEG version 252 is also created from multimedia data 250. MPEG is a digital data format used to store video data in a compressed form.

An MPEG version of the analog input (multimedia data 252) is sent to non-line storage 242 via a network that interconnects transfer system 246 and a computer system including non-line storage 242. For example, non-line storage is an E-MASS tape system. The MPEG version can be transmitted over the network using the File Transfer Protocol (FTP), for example.

Data is sent to storage by transfer system 246 independent of its content. For example, MPEG version 252 is stored in non-line storage 242 without the need to determine its content. The cataloguing system creates a catalogue that can be used to perform content-based searches. A content-based search retrieves data based on the ideas or concepts contained in the data.

Cataloguing System

Cataloguing system 240 catalogues multimedia data input (e.g., timecoded VHS 256) received from transfer system 246 and other data 254 that includes data in the form of text. A catalogue is generated by cataloguing system 240. The catalogue created by cataloguing system 240 is stored in indexing server 216.

The catalogue includes one or more catalogue elements which can be a complex multimedia asset. A complex multimedia asset can consist of one or more attribute elements. An attribute element is an attribute that can have attributes. An attribute is a piece of information. A catalogue element is associated with a portion of multimedia data (e.g., one or more frames of video data). The result of a search operation performed by the browser identifies a set of catalogue elements that can satisfy a search request. Each catalogue element has an associated ID (e.g., an integer ID) that uniquely identifies the catalogue element. A set of IDs that represent the set of catalogue elements identified in a search operation are sent to the archive server component for retrieval of the associated multimedia data. The section entitled Catalogue Instance below provides an instance of a catalogue that can be used with the invention. A detailed discussion of a cataloguing scheme is provided in a co-pending U.S. Patent Application entitled "Method and Apparatus for Cataloguing Multimedia Data", Ser. No. 09/184,921, filed on Jul. 8, 1996 and incorporated herein by reference and now U.S. Pat. No. 6,212,527.

Asset Management System

Referring to FIG. 2, asset management system 232 is used to access the data using the catalogue created by cataloguing system 240. Asset management system 232 identifies data having the desired content using search tools to query the catalogue to identify a set of catalogue elements having attributes that satisfy a search criteria. The data associated with the catalogue elements provide the content specified by the search criteria. The following provides a brief summary of asset management system 232. A more detailed discussions of an asset management system is provided in a co-pending U.S. Patent Application entitled "Method and Apparatus for Management of Multimedia Assets", pending Ser. No. 09/157,612, filed on Jul. 10, 1996 and incorporated herein by reference.

Asset management system 232 includes browser 218, indexing server 216, archive server 206, tertiary storage manager 204, and method player 202. Generalized interfaces 210, 214, and 212 define a communication protocol that can be used by any vendor-supplied browser, indexing server, archive server, tertiary storage manager, and/or method player to communicate with another asset management system component.

Browser 218 includes a user interface in which a user can formulate a search request for data. The search request contains search criteria that can be used to identify catalogue elements that identify portions of multimedia data. Attributes and/or attribute elements associated with the catalogue elements contain information that can be compared against the search criteria contained in the request. The comparison identifies catalogue elements that satisfy the search criteria. That is, catalogue elements are selected that have attributes and/or attribute elements that satisfy the search criteria.

A request for data is received by browser 218. Browser 218 in combination with indexing server 216 locates a set of catalogue elements that satisfy criteria specified in the request. The set of catalogue elements are sent to archive server 206 for retrieval. Archive server 206 maintains an identification of the location of each piece of multimedia data. Thus, when a set of catalogue elements is received from browser 218, archive server 206 can identify the location of the portions of multimedia data having the desired content (i.e., the portions of multimedia data associated with the catalogue elements contained in the set).

The multimedia data associated with a catalogue element is retrieved by archive server 206 in conjunction with tertiary storage manager 204. Tertiary storage manager 204 manages a store that contains multimedia data. Asset management system 232 can consist of multiple instances of tertiary storage manager 204 to manage each data store. Tertiary storage manager 204 can manage various types of data store. Archive server 206 identifies the instance of tertiary storage manager 204 that manages the store containing the requested multimedia data. Tertiary storage manager 204 retrieves the data based on a request from archive server 206 and transmits the data to method player 202. Method player 202 prepares the data (converts the data from MPEG to video format) and transmits the prepared data to browser 318. Browser 218 formats a display region and displays the data in the display region.

Access Levels

Figure 6:
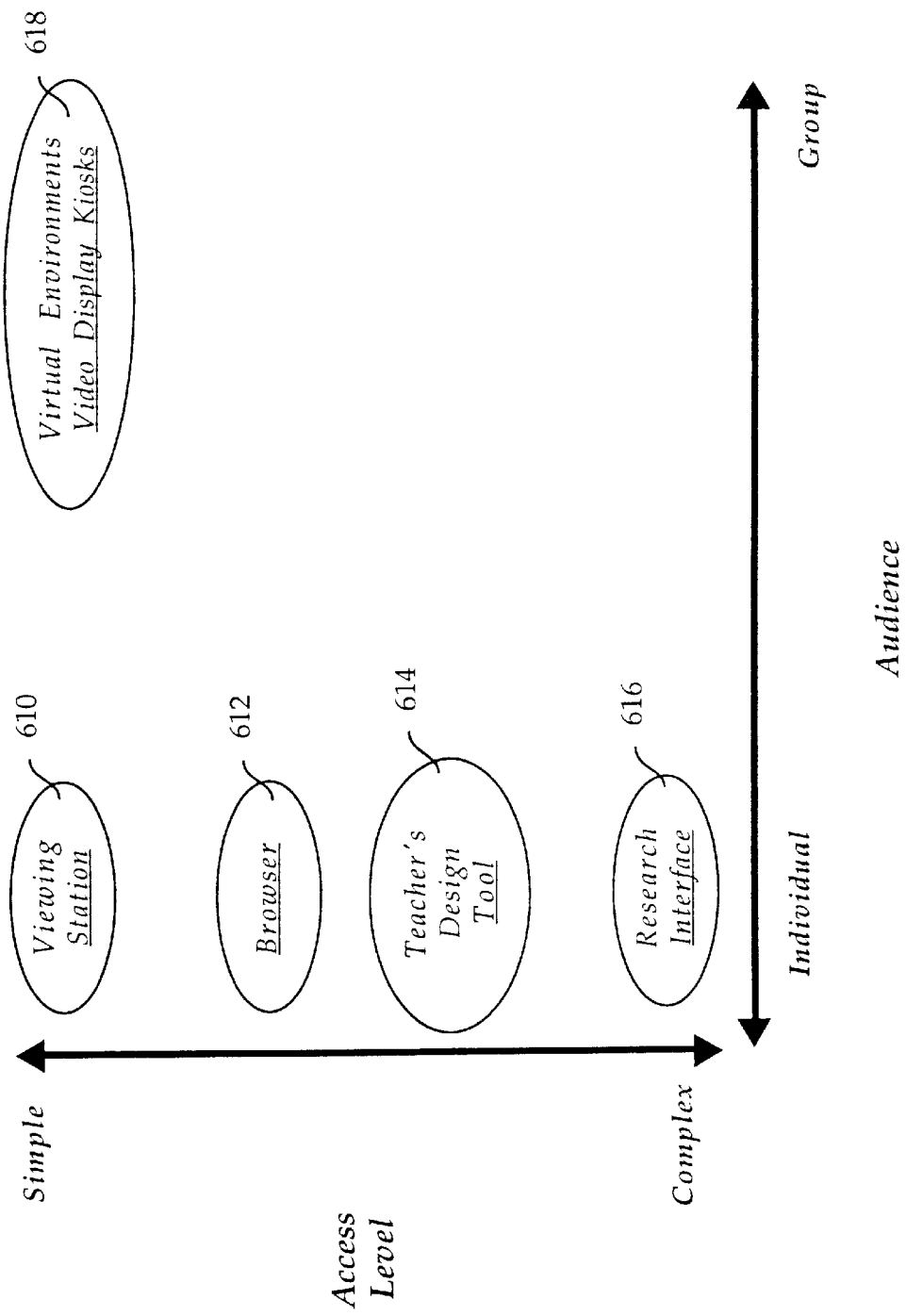
FIG. 6 provides examples of access levels and audiences that can be accommodated by interfaces provided by an asset management system according to an embodiment of the invention.

Asset management system 232 can include various access levels each of which is associated with a level of interface to access the data based on the type of audience. FIG. 6 provides examples of access levels and audiences that can be accommodated by interfaces provided by an asset management system according to an embodiment of the invention.

The vertical axis is used for access level. An access level ranges from simple to complex. Audience examples are depicted along the horizontal axis. The audience can be an individual or a group of people, for example. At the complex access level, the audience must be able to understand the catalogue structure (i.e., catalogue element and associated attributes and attribute elements). An interface used at this level that requires knowledge of the catalogue structure is research interface 616. At the next access level (e.g., a programmer's level), an interface consisting of low-level software routines are available to query the catalogue and its associated attributes and attribute elements. The low-level software routines can be used to create a higher level of abstraction of objects. These objects can become selectable elements in a graphical-user interface (GIJI) for a development tool that can be used to create a higher-level interface used in the next access level. Such a higher-level interface is teacher's design tool 614. The GUI in teacher's design tool 614 can include a drag and drop capability to create other GUIs and associate GUI objects to objects that supply functionality (e.g., objects contained in a higher-level interface.)

Teacher's design tool 614 is an example of a development tool that can be used to create browser 612, for example. Browser 612 provides tools for interfacing with the multimedia data that make it simpler to user than teacher's design tool 614. For example, this level includes an ability to view instances contained in a catalogue and its associated attributes and attribute elements. The user can create a query by dragging these instances into a search box and specifying conjunction information (e.g., "and" or "or).

At the simplest access level, predefined sets are created and can be replayed by an individual using single video viewing screen (video screen 610). Virtual environments or video display kiosks 618 can be created using predefined sets for viewing by groups of people.

Cache

A caching mechanism is implemented by asset management system 232 to store retrieved data locally. Preferably, cache is used to store multimedia data that is being or will be played on browser 218. Asset management system 232 locates the data and, if necessary, stores the data in local cache (e.g., cache 244). Asset management system 232 manages cache and the retrieval of data using cache.

Cache Management

Preferably, cache management is supplied by an instance of tertiary storage manager 204. The instance of tertiary storage manager 204 that manages the data denormalizes the data allowing for faster access. Tertiary storage manager 204 that manages cache 244 uses a least recently used (LRU) scheme. Thus, multimedia data that has the oldest access time is purged to make room for newly accessed data.

Preferably cache 244 is a size that can meet user demand requested by a user. That is, cache 244 is a size that can temporarily store requested data such to optimize retrieval transparently (e.g., requested data can be cached for use by the user). Fot example, cache 1 through N can each have a one terabyte (Tb) capacity. Preferably, tertiary storage manager 204 uses a least recently used (LRU) scheme for managing the cache. That is, data copies that are the least recently used can be purged to make room for new data. The ID attribute of a catalogue element can be used to maintain a log for the cached data. The log can identify the data contained in cache 244 and its use history as well as a pointer to the data in cache 244.

Retrieval and Cache Management

The multimedia data associated with catalogue elements can be retrieved from offline storage such as a tape system. The invention also provides the ability to temporarily store multimedia data in cache such as cache 244 in FIG. 2. Cache can be local (i.e., cache that resides at the local site) or remote (i.e., cache at a remote site). In most cases, retrieval time is fastest when the data is retrieved from cache (either local or remote). When a tape system must be accessed to retrieve the data, retrieval time will most likely be slower. Therefore, it is preferable to determine whether the data is resident in cache before accessing a storage system such as a tape system. Further, it is preferable to manage the cache such that the data that is most likely to be needed is resident in cache.

Figure 4:
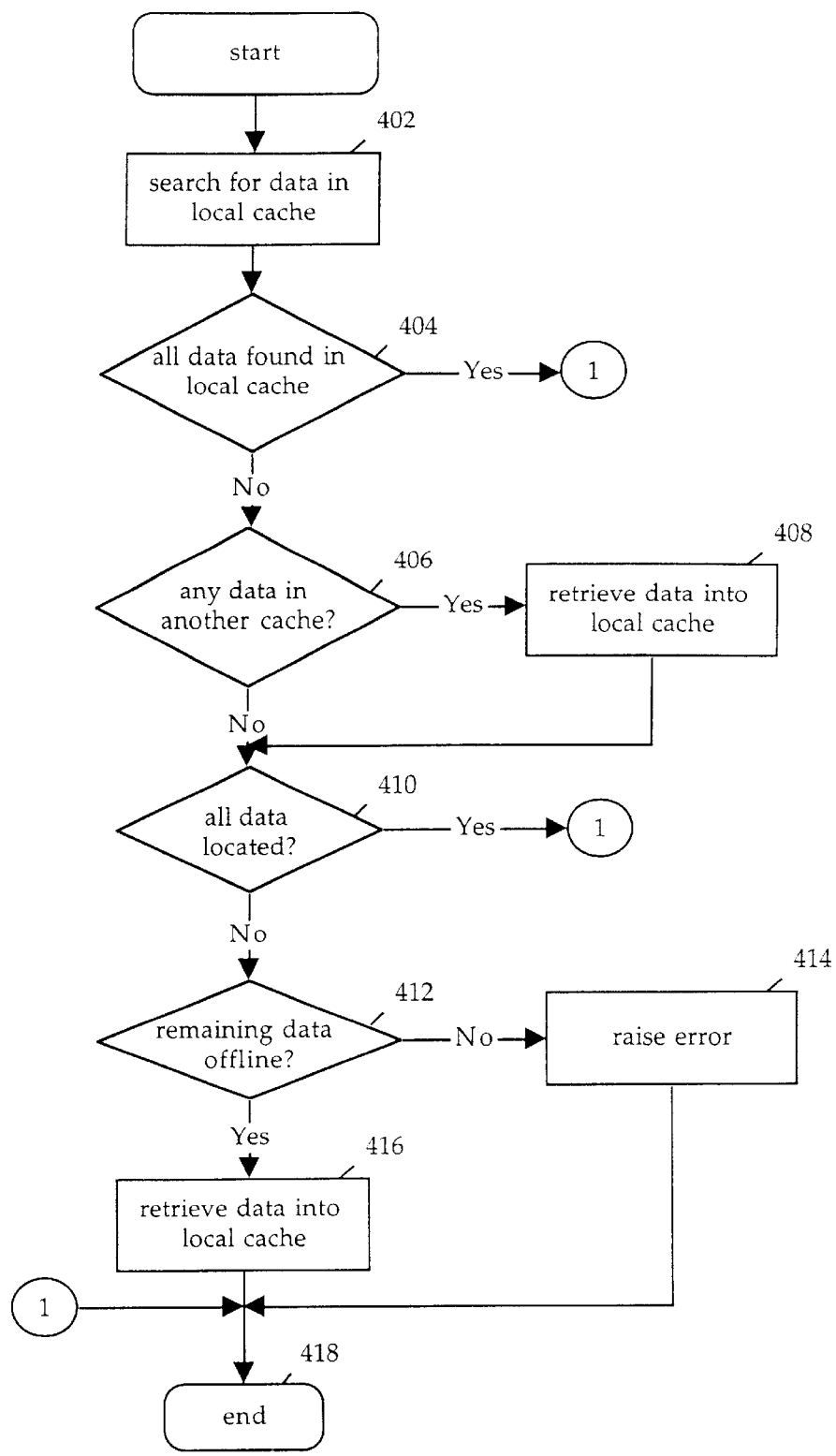
FIG. 4 provides a process flow for cache management and retrieval according to an embodiment of the invention.

Archive server 206 determines whether the portion of cache 244 resident at the same site (i.e., local cache) contains the multimedia data associated with the catalogue elements. If the multimedia data is not stored in local cache, the archive server can query other archive servers to determine whether the data is stored in the portion of cache 244 that resides at the other site (i.e., remote cache). If the archive server cannot find a copy of the data in cache 244, it will attempt to retrieve the data from permanent storage (e.g., non-line storage 242). FIG. 4 provides a process flow for cache management and retrieval according to an embodiment of the invention.

At step 402, archive server 206 searches for the data associated with the catalogue elements received from browser 218. When a set of catalogue elements is received, archive server 206 determines whether the associated data is stored in a local cache. For example, ID attributes associated with each catalogue element in the set can be compared against a log that contains the ID attributes for catalogue elements whose data is stored in the local cache. At step 404 (i.e., "all data found in local cache?"), a determination is made whether the data was found in the local cache. If so, the data is available and can be retrieved from local cache. Therefore, processing for this cache management request ends at step 418.

If all of the data does not reside in local cache, processing continues at step 406. At step 406 (i.e., "any data in another cache?"), the local instance of archive server 206 can query other (remote) instances of archive server 206 to determine whether any of the requested data is resident in a remote cache. If not, processing continues at step 410. If data is found in a remote cache, processing continues at step 408 to retrieve the data from the remote cache into the local cache. Processing continues at step 410.

At step 410 (i.e., all data located?"), a determination is made whether all of the requested data has been found at either a local or remote cache. If so, processing for this cache management request ends at step 418. If all of the data is not found in cache, processing continues step 412. At step 412 (i.e., "remaining data offline?"), offline storage is examined to obtain the remaining data. If all of the remaining data is not found offline, processing continues at step 414 to raise an error. If the remaining data is found offline, processing continues at step 416 to retrieve the offline data into local cache. Processing ends at step 418.

Figure 5:
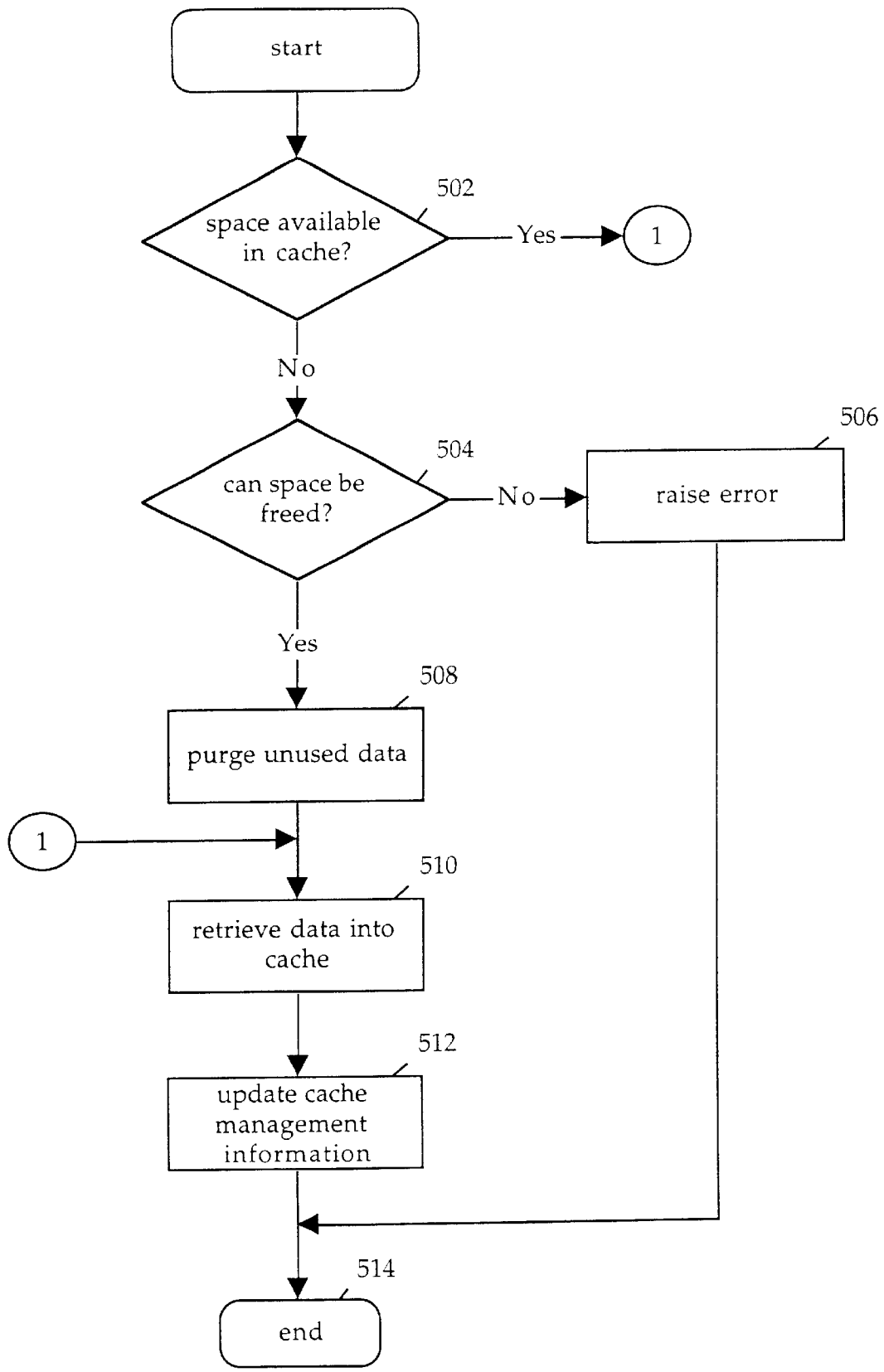
FIG. 5 provides a data retrieval into cache process flow according to an embodiment of the invention.

At steps 408 and 416, data found at a remote cache or in offline storage is retrieved into cache. As new data is cached, older data may need to be purged from cache to make room for the new data. In addition, tertiary storage manager 204 must update the cache log to reflect additions to or deletions from cache. FIG. 5 provides a data retrieval into cache process flow according to an embodiment of the invention.

At step 502 (i.e., "space available in cache?"), tertiary storage manager 204 determines the total amount of space available in cache. If there is available space for the data that is being retrieved, processing continues at step 510 to cache the data. If there isn't enough space available, processing continues at step 504. At step 504 (i.e., "can space be freed?"), a determination is made whether enough space can be freed for the data by purging data from cache that is currently not in use (e.g., not being played on a browser). If not, processing continues at step 506 to raise and error and processing ends at step 514. If enough data can be purged to make room for the new data, processing continues at step 508 to purge the unused data.

At step 510 the new data is retrieved into cache. At step 512, cache management information is updated. For example, the IDs associated with the purged data are removed from the cache management information (e.g., a cache log) and the IDs associated with the newly retrieved data are added to the log. LRU information can be set for the new data (e.g., the time of access of the data). In addition, tertiary storage manager 204 can perform operations that maintain information about the total amount of space used and/or available. Processing ends at step 514.

Named Cache

In addition to the regular cache that can be managed as discussed above, the invention includes a plurality of named caches. A named cache can be used to store data on a more permanent basis. A named cache is a portion of cache (e.g., cache 318) that is can be managed separate from the general cache pool. A named cache may be used for data that is accessed or has the potential for access on a more permanent basis. For example, one or more searches can yield a sub-catalogue (e.g., a subset of the set of catalogue elements associated with multimedia data 252) that contains data pertinent to a particular subject area or group of users. The named cache can be used to store the portions of multimedia data 252 associated with the sub-catalogue at a remote site such that it is not purged despite its LRU statistics. The portions of multimedia data 252 associated with a sub-catalogue can be retained permanently or semi-permanently. That is, the contents of the named cache can be retained for a specified period of time and is not subject to purge.

Referring to FIG. 5, step 504 can be expanded to include the notion of named cache. In determining whether space can be freed, a determination is made whether the cache that is currently being consumed is named cache. If so, the space cannot be freed to make room for the new data. Processing would continue at step 506 to raise an error. However, it is determined that the space is not named cache and it does not contain data that is currently in use, processing can continue at step 508 to purge the data.

Distribution

A distribution facility can be used to transmit the data thus giving a user access to all of the data contained in the digital library system despite the user's location. Multimedia data is permanently stored at a centralized location. Multimedia data that is requested by a user is cached from the centralized location to the user site. A wide area network can be used to interconnect user sites with the main site. The WAN can be used to transmit data that resides at the main site or another user site to a requesting user site. In addition, data can be transferred between sites via the Internet.

Either a centralized or decentralized distribution architecture can be used with the invention to distribute functionality (e.g., asset management functionality). In a centralized architecture, the asset management facility is located at a centralized site. Users connect to the asset management facility via the Internet, for example. The catalogue and multimedia data are stored at the central site. The catalogue is accessed at the central, or main site to identify the requested data. The data is then transmitted to the user via the Internet.

In a decentralized architecture, an instance of the asset management system is located at the user's site. A copy of the catalogue is resident at the user site. The multimedia data is permanently stored at a main site with copies of data that has accessed stored at the user's site. The local catalogue is accessed to identify the data requested in a user request. If a copy of the requested data does not exist at the local site, a search is made for the data at another site. The search first examines the cache at the other sites. If the data cannot be found in cache at the local or another site. The local site accesses the main site to retrieve the requested data. A vehicle such as a WAN or the Internet can be used to transmit the data between sites.

Figure 3:
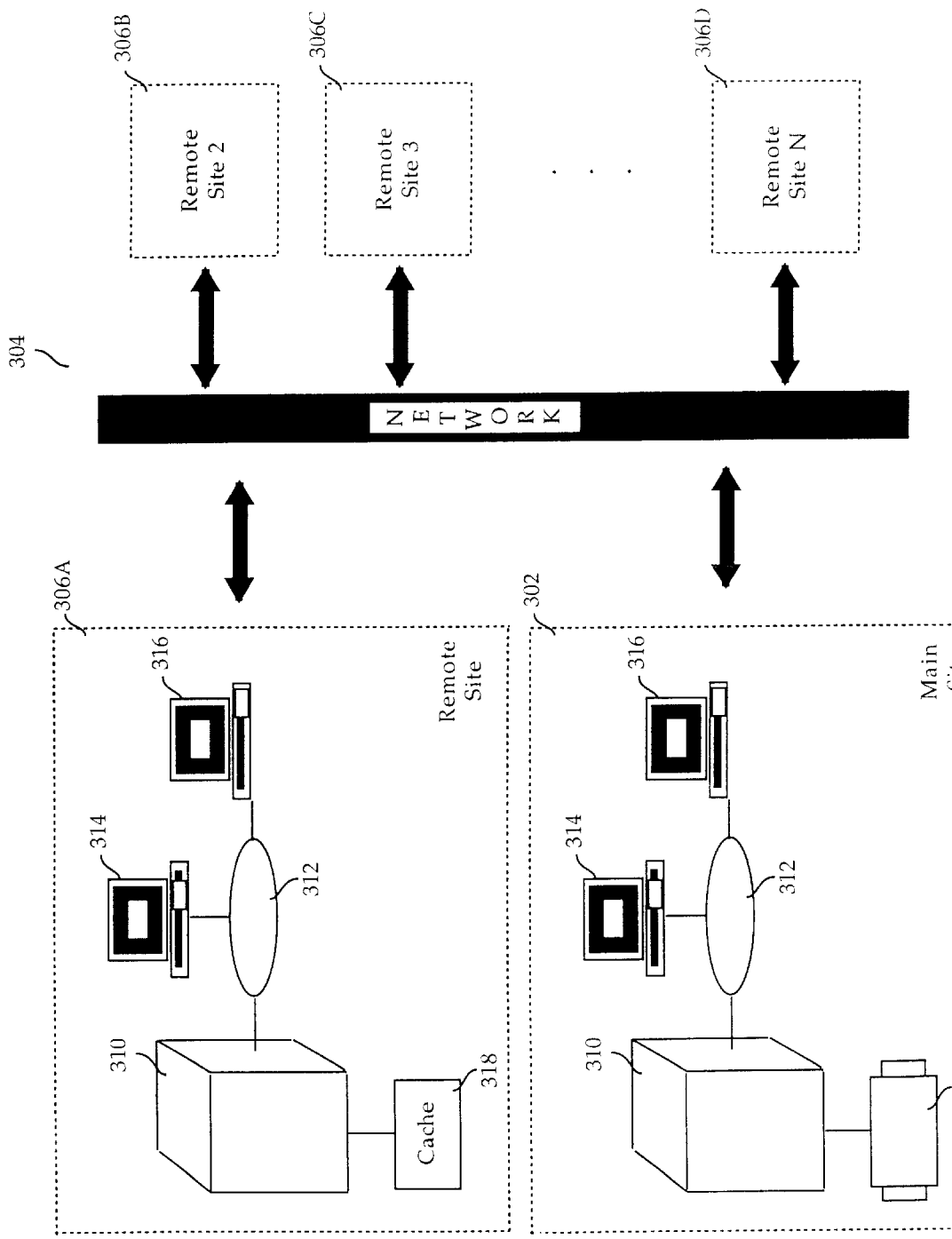
FIG. 3 provides a block overview of the data distribution subsystem according to an embodiment of the present invention.

FIG. 3 provides a block overview of the data distribution subsystem having centralized permanent storage for multimedia data and decentralized functionality according to an embodiment of the present invention.

A network is used to establish a link between a plurality of remote sites and a main site. Preferably, data distribution system 300 includes main site 302 and a plurality of remote sites (e.g., remote sites 306A–306D). These sites can be located around the world. For example, main site 302 is located in California with remote sites in Israel, Washington, D.C., New York, Connecticut and California. Each site (i.e., main site 302 and remote sites 306A–306D) includes asset management system 232. A site (i.e., main 302 or remote sites 306A–306D) is depicted having a processing unit 310 interconnected with terminals 314 and 316 via network 312. However, any site configuration having processing, storage and display capabilities can be used.

Network 312 is preferably a local area network (LAN). Network 304 is a wide area network that connects main site 302 with remote sites 306A–306D. Asynchronous Transfer Mode (ATM) switches are preferably used at each site (e.g., main site 302 and remote sites 306A–306D) to interconnect the sites. The ATM switches are available from various vendors such as FORE Technology, for example. In addition, sites 302 and 306A–306D can be interconnected via the Internet. The Internet can be used to send information from main site 302 to one or all of remote sites 306A–306D. In addition, a version of asset management system 232 can be placed on the Internet to allow access by Internet users.

Main site 302 has storage capacity sufficient to store a copy of all of the system's multimedia data. For example, permanent storage 342 is a tape robot mass storage device manufactured by EMASS. It has a capacity of 100 Terabytes (Tb), for example. A file system such as the AMASS file system available from EMASS is used as an interface to permanent storage 342. The file system runs on processing unit 310. Processing unit 310 is, for example, a supercomputer such as the Challenge supercomputer available from Silicon Graphics, Inc. A file containing a digital form (e.g., MPEG) of an analog tape is transferred to processing unit 342 and then stored in permanent storage 342.

Preferably, each site (e.g., main site 302 and remote sites 306A–306D) is capable of running asset management system 232. Preferably, a copy of the catalogue created by data collection subsystem 234 is resident at each site as well. When a user request is made at a site, asset management system 232 queries the catalogue resident at that site to identify the catalogue elements that satisfy the request. The selected catalogue elements are used to locate the associated portions of multimedia data 236. Cache 318 that is resident at the site is examined to determine whether it contains a copy of the portions of multimedia data 236 that satisfies the request. If so, the data is retrieved from the site's cache 318.

If the data is not resident in local cache, a check is made of each remote site's cache until the data is located or all of the remote sites have been examined. To facilitate the search, an index of each remote site's cache is replicated at the other remote sites. A site can therefore examine a locally stored index to determine what data is resident in cache at each site. If the data is not resident at a remote site (sites 306A–306D), the data is retrieved from main site 302 and a copy is sent to the remote site. The data is therefore retrieved first from a local cache, then, if necessary, from a remote cache or permanent storage.

Catalogue Instance

The multimedia data catalogue used in the invention preferably consists of one catalogue element that is referred to as a phrase. A phrase is associated with a portion of multimedia data. A phrase has a plurality of attributes some of which are attribute elements. The attribute elements that are attributes of a phrase include keyword, person, image, video (e.g., documentary footage), proposed person, and proposed keyword. The keyword, person, image, proposed person and proposed keyword attribute elements can have attributes that are also attribute elements. For example, attribute elements that are attributes of the keyword attribute element include thesaural keyword, thesaural person, keyword, and type. An index is built on the attributes and attribute elements. The index can be used to navigate through the catalogue (e.g., search for phrases).

Figure 7A:
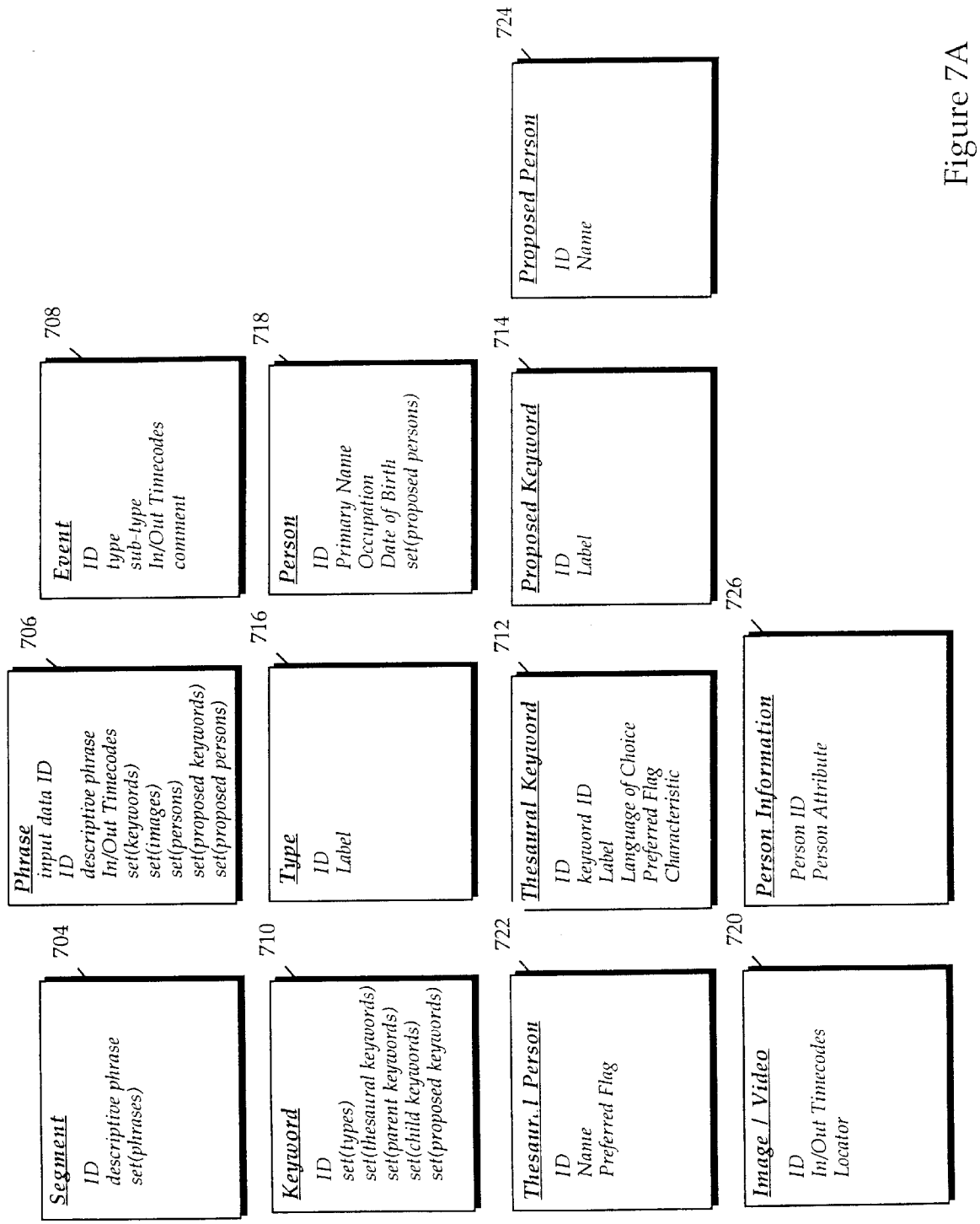
FIG. 7A provides an example of catalogue and attribute elements and their attributes according to an embodiment of the invention.

FIG. 7A provides an example of catalogue and attribute elements and their attributes according to an embodiment of the invention. Segment 704 is a container element. It can contain other elements. For example, segment 704 can contain one or more instances of phrase 706. In the invention, input data is decomposed into one or more pieces, or fragments. An instance of phrase 706 is associated with each input data fragment. Phrase 706 is a catalogue element. Phrase 706 has one or more attributes and/or attribute elements on which an index is built. The index can be used to navigate through the catalogue.

An attribute of phrase 706 is keyword 710. An instance of phrase 706 can be associated with one or more instances of keyword 710. Keyword 710 further defines aspects of an input data fragment. Preferably, an attribute of keyword 710 identifies content, or substance, for an input data fragment. The content or substance identified by keyword 710 is preferably expressed as a single word. However, content or substance can be expressed using multiple words.

To illustrate, the input data can be a videotape. The videotape is, for example, that of an interview conducted with a survivor of the Holocaust. The interview is broken down into the interviewee's pre-war, war-time, and post-war experiences. The interviewee's pre-war experience can be broken down into topics. A pre-war topic might be the interviewee's personal life, ski for example. Each topic can be broken down into sub-topics. In the example of the interviewee's personal life, a sub-topic might be the interviewee's relationship with family members, experiences at school, etc. Each sub-topic contains an information item. To further illustrate using the current example, an information item might be home, brother, sister, teacher, etc. In this example, the topic of the interviewee's personal life becomes an instance of-segment 704. The interviewee's relationship with family members and experiences at school become instances of phrase 706. The words home, brother, sister, and teacher become instances of keyword 710. The words home, brother, sister and teacher provide information regarding the content or substance of an input data fragment.

An instance of keyword 710 can be associated with one or more instances of thesaural keyword 712. An instance of thesaural keyword 712 is an instantiation of an instance of keyword 710. Thesaural keyword 712 specifies a value or label for its associated instance of keyword 710. Thesaural keyword 712 can be one or more words. Thesaural keyword 712 can be used, for example, to specify a value for an instance of keyword 710 in a particular language. Multiple instances of thesaural keyword 712 can be used to express the value of an instance of keyword 710 in multiple languages. Alternative expressions for the value of an instance of keyword 710 can be retained by instances of thesaural keyword 712 as well. Thus, the content or substance of an input data fragment can be expressed in multiple languages with a plurality of alternative expressions in each language. A preference can be associated with an instance of thesaural keyword 712 to identify it as a preferred alternative in a given language.

Figure 7B:
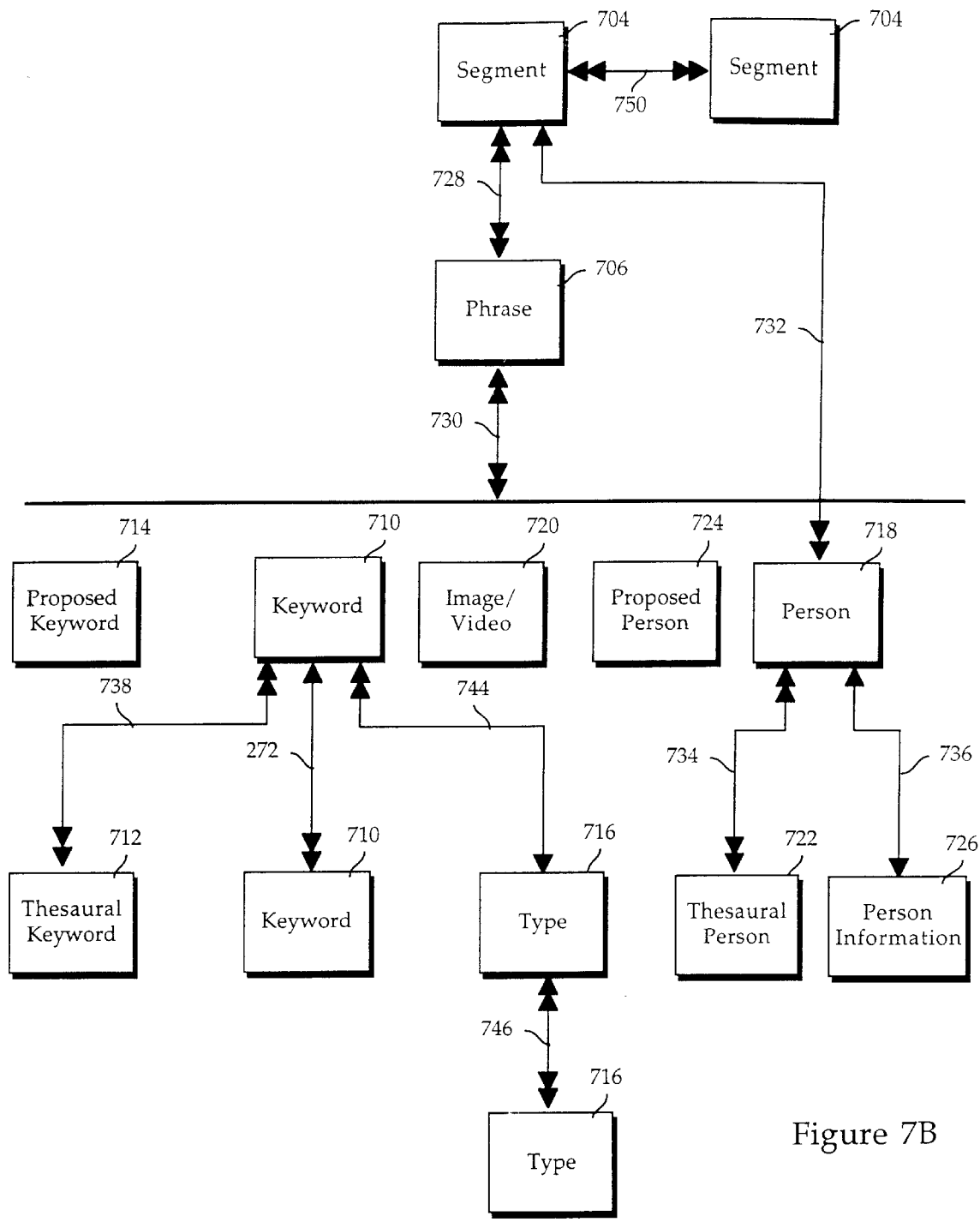
FIG. 7B illustrates relationships formed between the elements identified in FIG. 7A according to an embodiment of the invention.
Figure 7C:
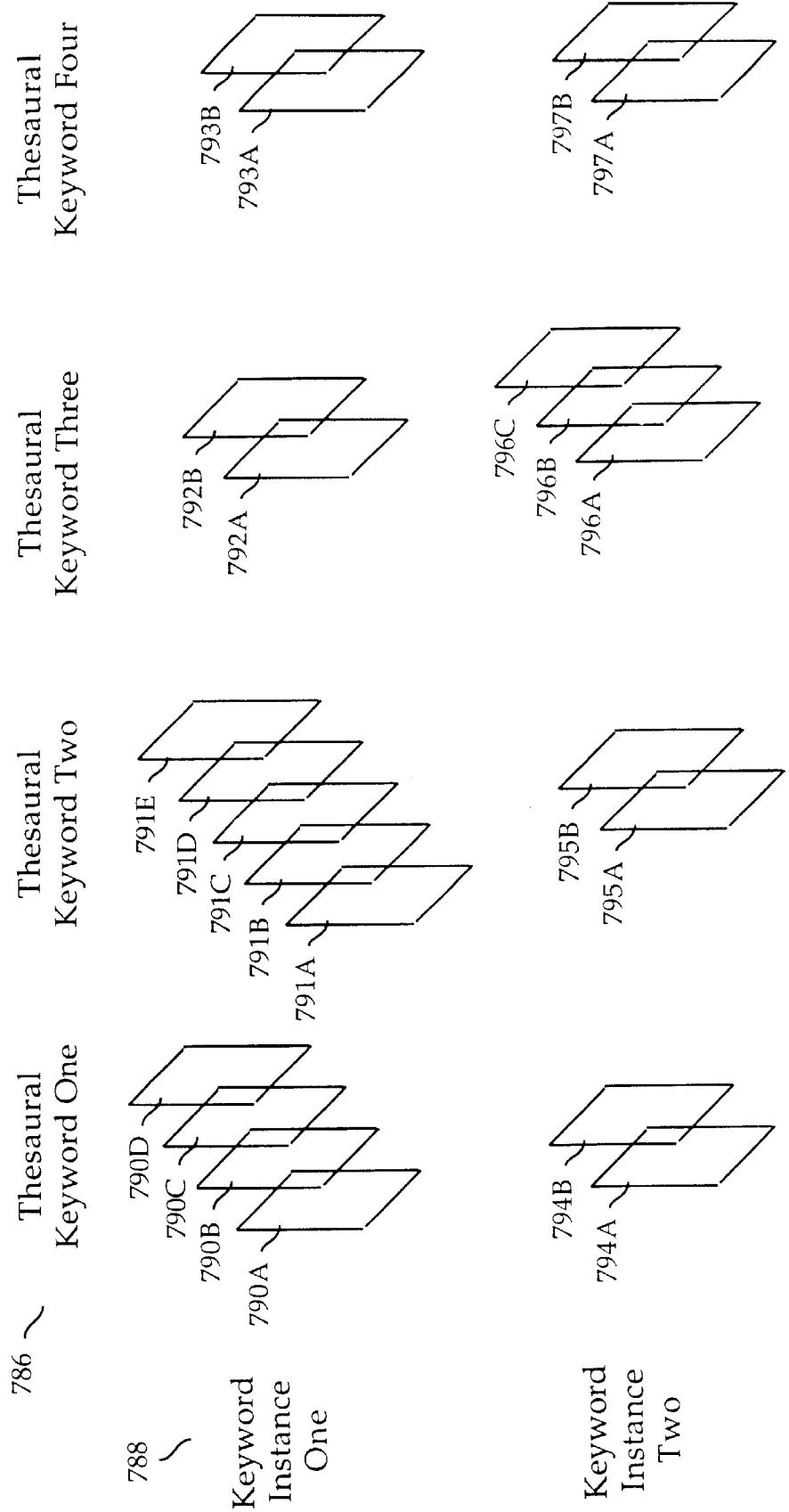
FIG. 7C provides an illustration of instances of keyword 710 and a plurality of associated label attributes according to an embodiment of the invention.

FIG. 7C provides an illustration of instances of keyword 710 and a plurality of associated label attributes according to an embodiment of the invention. A grid is displayed with axes 786 and 788. Instances of keyword 710 are displayed along a vertical axis, axis 786. A horizontal axis, axis 786 contains examples of languages in which a label associated to an instance of keyword 710 can be represented. Instances of thesaural keyword 712 are depicted at the intersections of these two axes.

Each instance of thesaural keyword 712 is an instantiation for an associated instance of keyword 710. Each instance of thesaural keyword 712 contains a label that can be used as the label for an instance of keyword 710. For example, thesaural keywords 790A–790D, 791A–791E, 792A–792B, and 793A–793B are instantiations of Keyword Instance One. Similarly, thesaural keywords 794A–794B, 795A–795B, 796A–796C, 797A–797B are instantiations of Keyword Instance Two.

An instance of thesaural keyword 712 can be an instantiation of an instance of keyword 710 in a particular language. For example, thesaural keywords 791A–791E are English instantiations of Keyword Instance One. Thesaural keywords 791A–791E provide alternate instantiations for Keyword Instance One. That is, each contains a English-language label for Keyword Instance One. Thus, Keyword Instance One can be associated with a different English-language label based on which instance of thesaural keywords 791A–791E is used to supply the label for Keyword Instance One. Similarly, Keyword Instance is associated with English-language alternatives contained in thesaural keywords 795A–795B.

Thus, within a language, an instance of keyword 710 can have alternate instantiations of thesaural keyword 712. An instance of keyword 710 can also have alternate instantiations of thesaural keyword 712 across multiple languages as exemplified in FIG. 7E. Alternate instantiations for Keyword Instance One exist in French (e.g., thesaural keywords 790A–790D), German (e.g., thesaural keywords 792A–792B), and Russian (e.g., thesaural keywords 793A–793B), for example. Similarly, Keyword Instance Two has alternative instantiations in French (e.g., thesaural keywords 794A–794B), German (e.g., thesaural keywords 794A–794C), Russian (e.g., thesaural keywords 797A–797B).

A preferred alternate instantiation of an instance of keyword 710 can be identified in each of the languages in which the keyword instance is represented. Thus, for example, thesaural keyword instance 790C can be identified as the preferred instantiation of Keyword Instance One for the French language. Similarly, thesaural keyword instances 791B, 792A, and 793B can be the preferred English, German, and Russian (respectively) instantiations for Keyword Instance One. Thesaural keyword instances 794A, 795B, 796C, and 797A can be the preferred French, English, German, and Russian instances (respectively) for Keyword Instance Two.

Referring to FIG. 7A, type 716 is associated with keyword 710. Type 716 provides attribute information for keyword 710. Type 716 can be used to include instances of keyword 710 in a classification or category. In other words, an instance of keyword 710 is an instantiation of an instance of type 716. For example, an instance of keyword 710 having an attribute of "Ford Bronco" could be associated with a type instance having an attribute of "car". Another instance of keyword 710 having an attribute of "Mustang" can also be associated with the same instance of type 716. Both instances of keyword 710 are instances of a car. One or more instances of type 716 can be associated with an instance of keyword 710. In the preferred embodiment, a hierarchy is established for instances of type 716. An instance of type 716 can be a parent to or a child of another other instances of type 716. An instance of keyword 719 that is associated with an instance of type 716 is also associated with the hierarchy of the instance of type 716.

Other attribute elements that can be associated with an input data fragment via phrase 706 include person 718, and image 720. Person 718 identifies an individual associated with an input data fragment. In the previous example, a personal life experience may contain a reference to a person. An instance of person 718 can be used to identify the reference. Person information 726 provides attribute information for an instance of person 718. An instance of image 720 is used for data such as a still photograph that is referenced in the input data.

In the preferred embodiment of the invention, some elements, such as keyword 710 and person 718, must be approved before becoming actual instances. Prior to approval, the instances are considered to be proposed instances. For example, proposed keyword 714 and proposed person 724 are attribute elements used to identify instances of keyword 710 and person 718 that have not yet been approved as actual instances. Proposed instances are reviewed and a determination is made whether to transform the proposed attribute element into an actual attribute element or to otherwise dispose of the proposed attribute element.

Person Information 726 is an attribute element associated with person 718. A "one-to-one" relationship (relationship 736) exists between person information 726 and person 718. Person information 726 contains attributes for person 718. The attributes of person information 726 contain information for a person having an instance of person 718.

Events can also be associated with input data. Each event becomes an instance of event 708. As previously described, input data can be decomposed into input data fragments each of which is associated with an instance of phrase 706. Input data can also be decomposed into input data fragments that are associated with instances of event 708. A type attribute is associated with event 708. Examples of an event type in the preferred embodiment include a segment, phrase, break between tapes, quality assurance details, facts, and miscellaneous (or other). An event can be used to access the associated input data fragment. An instance of event 708 can be used to access an input data fragment. For example, an instance of event 708 of type phrase can be used to locate the input data fragment associated with an instance of phrase 706.

Another example of an event type is a quality assurance event. In the preferred embodiment of the invention, a quality assurance mechanism can be used to monitor the quality of the input data and provide feedback. Quality assurance events are used to mark the input data. An event can mark a positive, negative, or neutral quality assurance event. For example, video input data is being collected in multiple interviews. Each interview can be reviewed to identify parts of the interview process that are noteworthy. Where, for example, an interviewer does not follow-up with an interviewee to obtain additional details, a negative quality assurance event can be created. A positive event can be similarly created. An event that is neither positive nor negative (i.e., informational or neutral) can also be created. A report of quality assurance events can be generated and used to provide feedback to the persons involved in collecting the input data.

Relationships of Elements

In the preferred embodiment, catalogue and attribute elements are interrelated. Relationships are formed between two or more elements using the invention. FIG. 7B illustrates relationships formed between the elements identified in FIG. 7A according to an embodiment of the invention. A "many" relationship is signified using a double arrow. A "one" relationship is identified using a single arrow. Relationship 728, for example, is a "many-to-many" relationship. That is, one or more instances of segment 704 can be related to many instances of phrase 706. Alternatively stated, segment 704 contains one or more instances of phrase 706. One instance of phrase 706 can be related to multiple instances of segment 704. That is, an instance of phrase 706 is contained within one or more instances of segment 704. As illustrated by relationship 746, one or more instances of type 716 can be related to other instances of type 716.

A "many-to-many" relationship (relationship 730) exists between phrase 706 and proposed keyword 714, keyword 710, image/video 720, proposed person 724 and person 718. An instance of phrase 706 can be related to a set of proposed keywords, a set of keywords, a set of images and/or video, a set of proposed persons,:and a set of persons, each set having zero or more members. Further, an instance of proposed keyword 714, keyword 710, image 720, proposed person 724 or person 718 can be related to more than one instance of phrase 706.

Relationship 738 illustrates a "many-to-many" relationship between keyword 710 and thesaural keyword 712. An instance of keyword 710 can be associated with one or more instances of thesaural keyword 712. The same instance of thesaural keyword 712 can be associated with one or more instances of keyword 710.

As previously stated, instances of type 716 can be interrelated with other instances of type 716 via a type hierarchy. Relationship 744 identifies an instance of type 716 as a parent or child of another instance of type 716. Similarly, the instances of keyword 710 are interrelated via a keyword hierarchy. Keyword 710 can be. related to other instances of keyword 710 via relationship 742. Relationship 742 identifies an instance of keyword 710 as a parent or child of another instance of keyword 710. Relationship 744 relates keyword 710 and type 716. That is, one instance of keyword 710 is related to an instance of type 716. Conversely, an instance of type 716 can be associated with multiple instances of keyword 710.

Further, an instance of keyword 710 can be related to many instances of type 716 via relationships 742 and 746. That is, an instance of keyword 710 has a type that is associated with an instance of type 716. In addition, the instance of keyword 710 inherits the types associated with the children of its associated instance of type 716.

Person 718 and person information 726 have a "one-to-one" relationship via relationship 728. Person 718 and thesaural person 722 are related via relationship 734. Person 718 can be associated with multiple instances of thesaural person 722. An instance of thesaural person 722 can be related to multiple instances of person 718 via relationship 734.

Segment 704 is a container element. That is, as illustrated by relationship 728, seogment 704 can contain multiple instances of phrase 706. Segment 704 is defined by the set of elements that it contains. For example, segment 704 is, for example, a chapter segment, a testimony segment, or a general segment. Instances of phrase 706 can be grouped in the order in which they occur in the input data in a chapter segment. As a testimony isegment, segment 704 contains a grouping of instances of 704 associated with the input data. For example, a testimony segment can contain all instances of segment 704 that are associated with a videotaped interview. Person 718 can be related to segment 704 via relationship 732. At least one instance of person 718 is related to an instance of segment 704 that is a testimony segment via relationship 732.

Relationship 750 illustrates the relationship between instances of segment 704 (i.e., a testimony segment) that act as a container for other instances of segment 704. A general segment contains a set of instances of phrase 706 that are not necessarily related to particular input data. A general segment can be a collection of phrases that meet a certain criteria. For example, a general segment can contain instances of phrase 706 that are related to an instance of keyword 710 having a value of "teacher".

Segment 704 therefore identifies a group of catalogue elements (e.g., phrase 706. An instance of segment 704 can identify all catalogue element instances. Other instances of segment 704 can identify a subset of catalogue elements. Thus, for example, an instance of segment 704 can identify all instances of phrase 706 or a some subset of all of the instances of phrase 706. The set including all instances of phrase 706 is a catalogue. A smaller catalogues that contain a subset of all instances of phrase 706 is also a catalogue. Within a catalogue, a smaller catalogue can be created by, for example, a query operation or user designation.

A set of catalogue elements can be identified by querying the attribute elements, for example. A query operation can be performed on the attribute elements to examine other attribute elements associated with a catalogue element. A query operation identifies a set of cataloguing elements (e.g., instances of phrase 706) that satisfy the criteria specified in the query. A set of cataloguing elements identified in a query are grouped in an instance of segment 704. A user can also specify a collection of phrases 706 that can be grouped in an instance of segment 704.

Attributes

FIG. 7A provides examples of attributes for catalogue and attribute elements according to an embodiment of the invention. Segment 704 contains an identifier (ID), a descriptive phrase, and a set of phrases, for example. The phrases related to an instance of segment 704 are included in the segment instance's set of phrases. A set is formed by creating relationships between the elements. FIG. 7B illustrates examples of the relationships that exist between elements in an embodiment of the invention. The relationships that form a set can be implemented using any of the known techniques known in the art. For example, the relationships can be implemented in a programming language using pointers. In a relational database management system, for example, the relationships can be formed using relations and primary and foreign keys.

Referring to FIG. 7A, phrase 706 includes an input data ID (e.g., identifies the input data from which the phrase was generated), an ID, a descriptive phrase, In/Out timecodes (i.e., a corresponding location within the input data), a set of keywords, images, persons, proposed keywords, and proposed persons. Keyword 710 includes an ID, and sets of types, thesaural keywords, child keywords and parent keywords. The child and parent keyword set form relationships for the keyword hierarchy. The set of thesaural keywords related to keyword 710 contain keyword values or labels for keyword instance.

Person 718 includes an ID, a primary name, an occupation, date of birth, and a set of proposed persons. Person information 726 contains a person ID for the associated instance of person 718. Person information 726 contains one or more attributes for the associated instance of person 718. The attribute information can vary depending on the multimedia information being catalogued. For example, the catalogued multimedia data may consist of interviews with individuals. An instance of person 718 can be instantiated and associated with an interviewee. Person information 726 associated with the instance of person 718 can then include biographical information of the interviewee. The multimedia data videotaped sporting events. In this case, an instance of person 718 can be created for a person associated with the sporting event (e.g., player, referee, and broadcasting personnel). An instance of person information 726 associated with the instance of person 718 can include statistical information associated with the participant.

An event 708 includes an ID, type (e.g., segment, phrase, interviewer, videographer, fact, or other), sub-type (e.g., a positive, negative, or informational event), timecodes, and a comment (or descriptive note).

Thesaural keyword 712 includes an ID, a keyword ID (i.e., the ID for an instance of keyword 710 for which the thesaural keyword instance is an alternative), a label (i.e., the value of the keyword instance to which the thesaural instance is related), a language of choice identifier (or language ID), a preferred flag, and a characteristic (or class). If set, the preferred flag specifies that the thesaural keyword instance is the preferred alternative for the related keyword instance in the language specified by the language ID. The characteristic attribute further defines the thesaural keyword instance. It can be used to identify that thesaural keyword instance is a slang word, for example.

An ID, timecode and locator are included as attributes for image 720. The locator attribute is used to locate the digitized image, for example. Proposed keyword 714 includes an ID and a label. It is also possible to include the attributes contained in keyword 710 in proposed keyword 714. Thus, the user that is proposing a new keyword can enter as much information regarding the proposed keyword. Proposed person 724 includes an ID and name attribute. Like proposed keyword 714, the attributes associated with person 718 can be included in proposed person 724. Type 716 includes an ID and a label.

Elements and their relationships can be managed using a cataloguing mechanism and a relationship management mechanism. The cataloguing mechanism includes a user interface that includes a series of screens. During cataloguing, a user (e.g., a cataloguer) reviews the input data and causes elements to be instantiated and associated with the input data and other elements. Elements that already exist can be associated with the input data during cataloguing. In addition, a cataloguer can propose new elements and relationships. The relationship management facility is used to review the elements and relationships proposed by a cataloguer. The relationship management facility can also be used to create new elements and relationships.

Thus, a digital library system has been provided.

What is claimed is:

1. A digital library system comprising:
   a means for catalouging multimedia data using at least one catalogue element associated with a plurality of keywords identifying said multimedia data;
   a means for managing access to said cataloguing system; and
   a means for distributing said multimedia data.

2. The system of claim 1 wherein said managing access further comprises:
   a means for browsing said cataloguing system;
   a first means for interfacing with an archive server;
   a second means for interfacing with a method player.

3. The system of claim 2 wherein an indexing server further comprises:
   a means for a managing a database, said at least one catalogue element, and a plurality of attributes and attribute elements coupled to said at least one catalogue element.

4. The system of claim 3 wherein a text interface further comprises:
   a means for querying said at least one of catalogue element;
   a means for querying said plurality of attributes and attribute elements.

5. The system of claim 2 further comprising a means for storing data using a tertiary storage manager.

6. The system of claim 1 wherein said distributing said multimedia further comprises:
   a means for permanently storing said multimedia data in said digital library system at a main site;
   a means for temporarily storing some or all of said multimedia data in said digital library system at a plurality of remote sites.

7. A system for retrieving data in a digital library system comprising:
   a means for searching a local cache for a portion of multimedia data stored in said digital library system having a catalogue of said multimedia data comprising at least one catalogue element associated with a plurality of keywords of said catalogue, said plurality of keywords identifying said portion of said multimedia data, said plurality of keywords being interrelated by one or more of associative, whole-part and inheritance relationships;
   a means for retrieving said portion of multimedia data into said local cache from a remote cache, if said portion of multimedia data is resident in said remote cache and is not found in said local cache;

a means for retrieving said portion of multimedia data into said local cache from permanent storage, if said portion of multimedia data is resident on permanent storage and is not found in said local cache or said remote cache.

8. The system of claim 7 wherein said retrieving into local cache further comprises:

a means for determining whether there is space available in said local cache for said portion of multimedia data;

a means for freeing space in said local cache for said portion of multimedia data, if there is not enough space available;

a means for updating cache management information.

9. The system of claim 8 wherein said determining further comprises:

a means for determining whether said cache contains information that is currently being used;

a means for determining whether said cache contains information that is marked for semi-permanent retention;

a means for freeing said cache, if said cache does not contain information currently in use and said cache is not marked for semi-permanent retention.

10. A computer system for cataloguing multimedia data comprising:

a means for creating a catalogue comprising a plurality of elements and relationships between said plurality of elements, said plurality of elements identifying data associated with said multimedia data, said data including keywords interrelated via one or more associative, whole-part and inheritance relationships, and other multimedia data associated with said multimedia data;

a means for specifying a description for a portion of said multimedia data;

a means for creating a catalogue element in said catalogue, said catalogue element containing a pointer to said portion of said multimedia data; and a means for creating for said catalogue element a pointer to at least one of said keywords, said at least one of said keywords containing a plurality of pointers to a set of elements in said catalogue interrelated to said at least one of said keywords via said one or more associative, whole-part and inheritance relationships, and creating for said catalogue element a plurality of pointers to elements in said catalogue that identify other multimedia data associated with said portion of multimedia data.

11. The system of claim 10 wherein said creating a pointer to at least one of said keywords further comprises:

a means for identifying references to said at least one of said keywords in said description; and a means for creating said pointer to at least one of said keywords for said catalogue element.

12. The system of claim 10 further comprising:

a means for examining said proposed element to determine whether it is an approved element;

a means for transforming said proposed element into an existing attribute element when said proposed element is an approved element;

a means for deleting said proposed element when said proposed element is an unapproved element.

13. The system of claim 12 wherein said transforming further comprises a means for inserting said proposed element into a hierarchy of elements.

14. The system of claim 10 wherein one of said plurality of elements is a thesaural element for use as an alternate for another element, said system further comprising:

a means for identifying said another element;

a means for creating a relationship between said thesaural element and said another elemental.

15. The system of claim 10 further comprising a means for deleting said catalogue element from said index.

16. The system of claim 15 wherein said deleting further comprises:

a means for identifying said at least one of said keywords;

a means for reassigning said at least one of said keywords when said at least one of said keywords can be reassigned;

a means for deleting said at least one of said keywords when at least one of said keywords cannot be reassigned;

a means for deleting said catalogue element.

17. The system of claim 16 wherein said reassigning further comprises a means for modifying relationships between said catalogue element and said at least one of said keywords such that said at least one of said keywords are no longer related to said catalogue element.

18. The system of claim 16 wherein said deleting further comprises:

a means for locating a plurality of attributes and attribute elements, said plurality of attributes and attribute elements are related to said at least one of said keywords;

a means for reassigning said plurality of attributes and attribute elements when said plurality of attributes and attribute elements can be reassigned;

a means for deleting said plurality of attributes and attribute elements when said plurality of attributes and attribute elements cannot be reassigned;

a means for deleting said at least one of said keywords.

19. The system of claim 10 further comprising a means for creating an event element for a second portion of said multimedia data, said event element represents an event associated with said second portion of said multimedia data.

20. The system of claim 19 wherein said event element represents a quality assurance event.

* * * * *